US007680906B2

(12) United States Patent
Helander

(10) Patent No.: US 7,680,906 B2
(45) Date of Patent: Mar. 16, 2010

(54) CONFIGURING DEVICES USING CONTEXT HISTORIES

(75) Inventor: Johannes Helander, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1007 days.

(21) Appl. No.: 11/279,743

(22) Filed: Apr. 13, 2006

(65) Prior Publication Data
US 2007/0198663 A1 Aug. 23, 2007

Related U.S. Application Data

(60) Provisional application No. 60/775,941, filed on Feb. 22, 2006.

(51) Int. Cl.
*G06F 15/177* (2006.01)
(52) U.S. Cl. .................. 709/220; 709/223; 706/47; 718/104
(58) Field of Classification Search ................ 709/200, 709/221, 223; 706/47; 725/87, 112; 726/11; 713/156; 718/104
See application file for complete search history.

(56) References Cited

U.S. PATENT DOCUMENTS

| 7,512,577 | B2 * | 3/2009 | Slemmer et al. ............. 706/47 |
| 2003/0018758 | A1 * | 1/2003 | Fan et al. .................... 709/221 |
| 2003/0229900 | A1 * | 12/2003 | Reisman ...................... 725/87 |
| 2004/0031058 | A1 * | 2/2004 | Reisman ...................... 725/112 |
| 2005/0256944 | A1 * | 11/2005 | Baek et al. ................... 709/223 |
| 2005/0278409 | A1 * | 12/2005 | Kutzik et al. ................ 709/200 |
| 2006/0010325 | A1 * | 1/2006 | Liu et al. ..................... 713/173 |
| 2006/0010491 | A1 * | 1/2006 | Prigent et al. ................ 726/11 |
| 2006/0155984 | A1 * | 7/2006 | Tsuchida et al. ............ 713/156 |

OTHER PUBLICATIONS

Alessandro Forin, Johannes Helander, Paul Pham, Jagadeeswaran Rajendiran, "Component Based Invisible Computing," in the 3rd IEEE/IEE Real-Time Embedded Systems Workshop, London, Dec. 2001.
Johannes Helander, Yong Xiong, "Secure Web Services for Low-Cost Devices", in 8th IEEE International Symposium on Object-oriented Real-time distributed Computing May 18-20, 2005, Seattle, Washington.

(Continued)

*Primary Examiner*—Jungwon Chang
(74) *Attorney, Agent, or Firm*—Lyon & Harr, LLP; Mark A. Watson

(57) ABSTRACT

A "Device Correlator," operates to identify and configure complementary devices as a combined function of device "touching" and observations of contextual history of human interaction with the various devices in an ad-hoc network environment. New devices are brought into a local trust domain of the network via a "touch-based" process. Further, as each device is added to the trust domain, a contextual history of user interaction with each device is recorded. This recorded context history is evaluated to determine probable device associations. Inter-device associations and device behaviors for trusted devices are then automatically configured as a function of both the context history and the capabilities of the various devices. The result is an automatically configured invisible computing environment, wherein the only actions required by the user are to bring new devices into the local area of the ad-hoc network, and then designate those devices as being trusted.

20 Claims, 6 Drawing Sheets

OTHER PUBLICATIONS

Moore, D, Essa, I., and Hayes, M.: Exploiting Human Actions and Object Context for Recognition Tasks, *7th IEEE International Conference on Computer Vision* (Corfu Greece, 1999).

Stajano, F. and Anderson, R. The Resurrecting Duckling: Security Issues for Ad-hoc Wireless Networks *LNCS 1796*, Springer-Verlag, 1999.

ATMEL® AT91® ARM® Thumb® Microcontrollers AT91M63200 Summary, ATMEL Corporation, 2000.

Xiong, Yong; Helander, Johannes; Forin, Alessandro; and Yuval, Gideon; Microsoft Corporation Technical Report MSR-TR-2003-65, "Secure Invisible Computing" Oct. 2003.

* cited by examiner

CONFIGURING DEVICES USING CONTEXT HISTORIES

CROSS REFERENCE TO RELATED APPLICATIONS

This application claims the benefit under Title 35, U.S. Code, Section 119(e), of a previously filed U.S. Provisional Patent Application, Ser. No. 60/775,941 filed on Feb. 22 2006, by Johannes Helander, and entitled "CONFIGURING DEVICES USING CONTEXT HISTORIES."

BACKGROUND

1: Technical Field

The invention is related to embedded real-time computing systems, and in particular, to automatic setup of device associations and trust among a plurality of distributed real-time components as a function of observed context histories and other available context information.

2: Related Art

As semiconductor technology becomes more mature and inexpensive, it becomes feasible to add computing and/or communication capabilities to many devices that used to be mechanical or analog, and to come up with new devices entirely. In fact, typical homes, offices, business, etc., are filled with electronic devices, such as personal computers, music systems, appliances, light switches, dimmers, and security systems, to name only a few. If all these systems could work together the utility of all the devices would improve.

Conventional schemes that attempt to integrate and coordinate the interoperability of such devices are often referred to under the heading of "invisible computing," sometimes also referred to as ubiquitous, pervasive, disappearing, or embedded computing. Devices used in invisible computing environments include embedded control systems, including consumer devices, intelligent sensors and smart home controls; communication-oriented devices such as digital cell phones and networking infrastructure; programmable peripherals and microcontrollers, home appliances, toys, games, etc. In all these cases, the devices typically include inexpensive microprocessors, such as a DSP, a VLIW, or a microcontroller rather than a general-purpose computing capability or platform (such as a PC-type computer).

In general, invisible computing operates to combine everyday electronic devices, such as those mentioned above, with computation and communication capabilities, thereby enabling new functions and aggregation. It does this without forcing users to learn new or archaic computer interfaces. Further, invisible computing makes it easy to adopt integrated systems by keeping costs down without requiring a pre-existing infrastructure.

For example, in an invisible computing environment, a communications enabled wrist watch could be used to control the volume on a radio. A refrigerator could automatically order more beer or send a notification to a TV screen to inform the user that its door is ajar. Energy could be saved by integrating sensors with a central heating system. Wearable medical devices could improve user's well-being. More natural user interfaces and ubiquitous communication can enable better social interaction regardless of the user's physical location. Smart toys in such an environment can not only entertain, but also educate children. These are just of few of many ideas that are enabled by invisible computing environments.

Invisible computing differs from personal computing mainly because the user interface is not screen and keyboard based, and resources (such as energy, memory, bandwidth, etc.) are often severely restricted. While a PC or workstation can use a general-purpose operating system (a collection of commonly needed features) an invisible computer can seldom afford such luxury because of its severely constrained resources. Consequently, software controlling such devices is generally specifically tailored to the specific applications that are to be performed by such devices.

Invisible computing is also slightly different from traditional embedded computing in that the devices are most often communicating with each other and/or with general-purpose computers (via either wired or wireless connections) acting as a central controller/scheduler, and have a limited power supply.

Limited resource, semi-intelligent devices found in invisible computing environments can perform rudimentary tasks autonomously. It is the ability to communicate with other "invisible" devices that gives them added capabilities, such that the value of the whole system is greater than the sum of its parts.

When the small devices have the ability to communicate with PCs or other "big machines" in addition to other peers, it is possible to leverage the advantages of invisible computing in desktop computing and vice versa. PCs can provide back-end processing for small devices, and small devices can extend the reach of a traditional PC further into user's everyday lives. For example, a small device can access a database on a web server; a PC can provide a user interface for examining and analyzing sensor data in a home; etc.

Unfortunately, while there are many advantages to the use of invisible computing environments, such systems are difficult to set up, and it is often virtually impossible to make many of the electronic devices work together. For example, besides the inter-device connections—either wired or wireless, the protocols spoken by such devices tend to be proprietary and application dependent. As a result, the user is relegated to archaic switches and menus to tell the various components of the overall system what to do. As a result, seamlessly integrated homes or offices are typically only achieved by using carefully planned systems that are installed by professional installation crews. Another problem with such systems, even when professionally installed, is that they tend to be insecure, thereby compromising the privacy of the users.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Automated environments, such as a home, office, or other location, can make user's lives more comfortable and easier. For example, a typical home automation system, or "invisible computing" environment, might be required to integrate a variety of distributed devices or components such as computers, cellular phones, refrigerators, TVs, heating systems, watches, heart rate monitors, toys, music systems, video systems, appliances, light switches, dimmers, security systems, etc., produced by different manufactures at different times.

However, turning a home, office, or other locality, into a seamlessly integrated, yet secure environment based on the use of such distributed components is generally a complicated and difficult process. Unfortunately, the average user often doesn't have the time or patience, or in many cases, the specialized knowledge, to set up or define the interaction and interoperation between the various components of an invisible computing environment.

To address these and other issues, a "Device Correlator," as described herein, operates to identify and configure complementary or correlated devices (such as, for example, a light switch and a light fixture) in an ad-hoc distributed network environment. In general, the Device Correlator achieves this interoperation between complementary devices by automatically configuring behaviors and interactions between any two or more devices within the network as a combined function of device touching and observations of contextual history of human interaction with the various devices or components.

The first step in this automatic configuration is to bring new devices into a local trust domain of the network. Trusting new devices is accomplished using any of a number of conventional techniques. For example, one simple technique is to use a "master key" or other master trusted device to initialize new devices as they enter the network. In this case, a new device is automatically trusted whenever the master key touches or otherwise designates that new device. Note that such concepts are well known to those skilled in the art, and will not be described in detail herein.

Further, as each device is added to the trust domain of the network, a contextual history of the user interaction with each device is recorded. This recorded context history is then evaluated to determine probable device associations. This information is then used to configure the resulting inter-device associations and device behaviors as a function of both the context history and the capabilities of the various devices. Note that the capabilities of the various devices are determined either as a function of direct reporting by the various devices, or by retrieving device capability information from a local or remote database given an identification of each device.

The result of the above summarized process is an automatically configured invisible computing environment, wherein the only actions required by the user are to bring new devices into the local area of the network environment, and then designate those devices as being trusted. So long as designation of the particular devices has some temporal or spatial relationship with other devices, evaluation of the context history of device designation allows the above-described automatic configuration.

In view of the above summary, it is clear that in various embodiments, the Device Correlator described herein provides a unique system and method for automatic setup and integration of a plurality of unique devices in an ad-hoc distributed network environment as a function of observed context history. Other advantages of the Device Correlator will become apparent from the detailed description that follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION

In the following detailed description, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
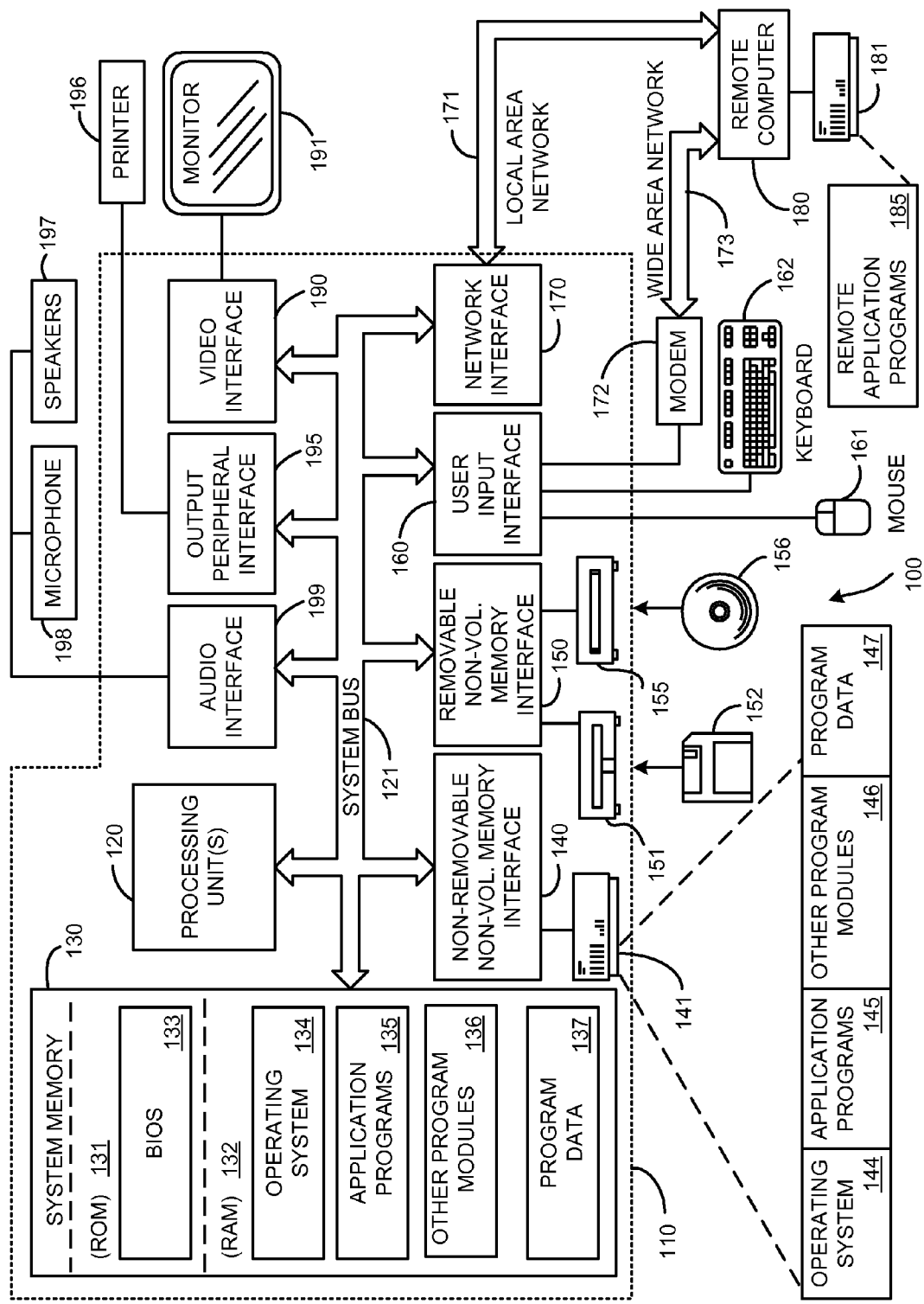
FIG. 1 is a general system diagram depicting a general-purpose computing device for use within an ad-hoc distributed network environment that is automatically configured by a "Device Correlator."
Figure 2:
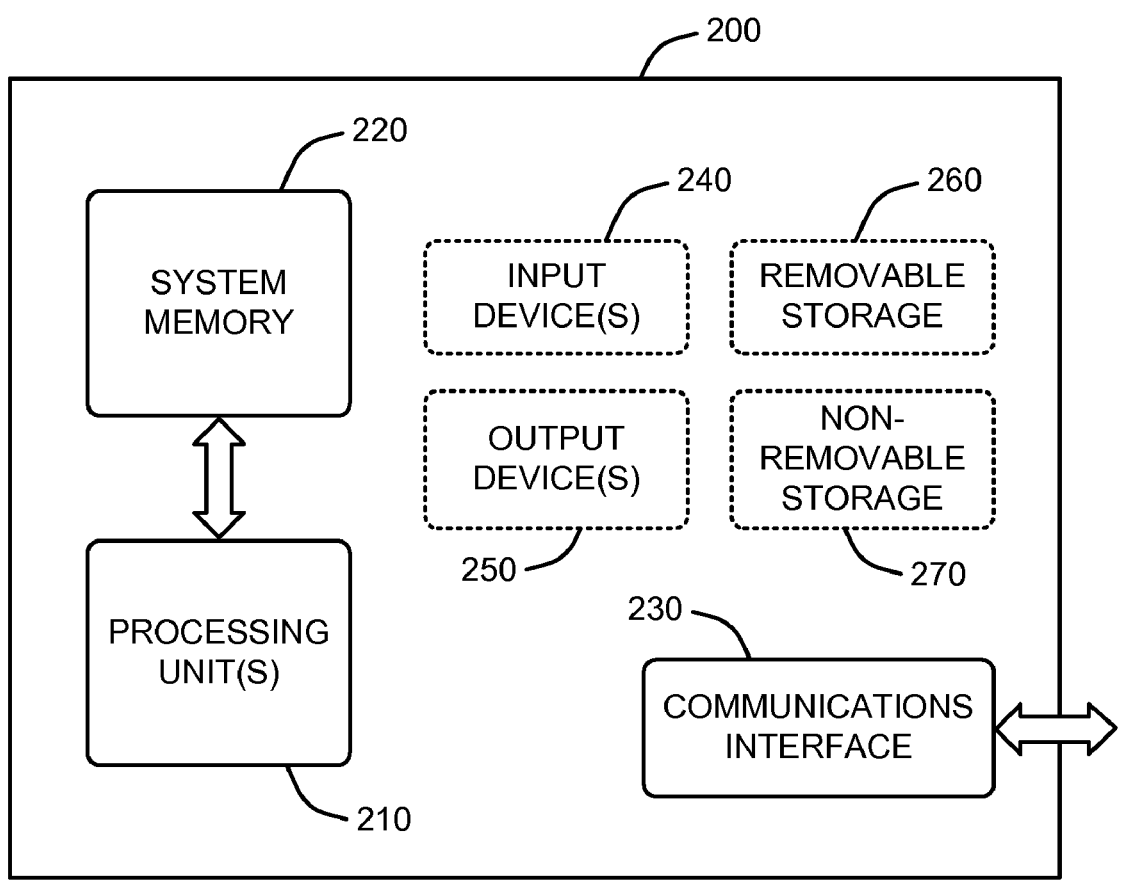
FIG. 2 is a general system diagram depicting a general device having simplified computing and I/O capabilities for use within an ad-hoc distributed network environment that is automatically configured by a "Device Correlator."
Figure 3:
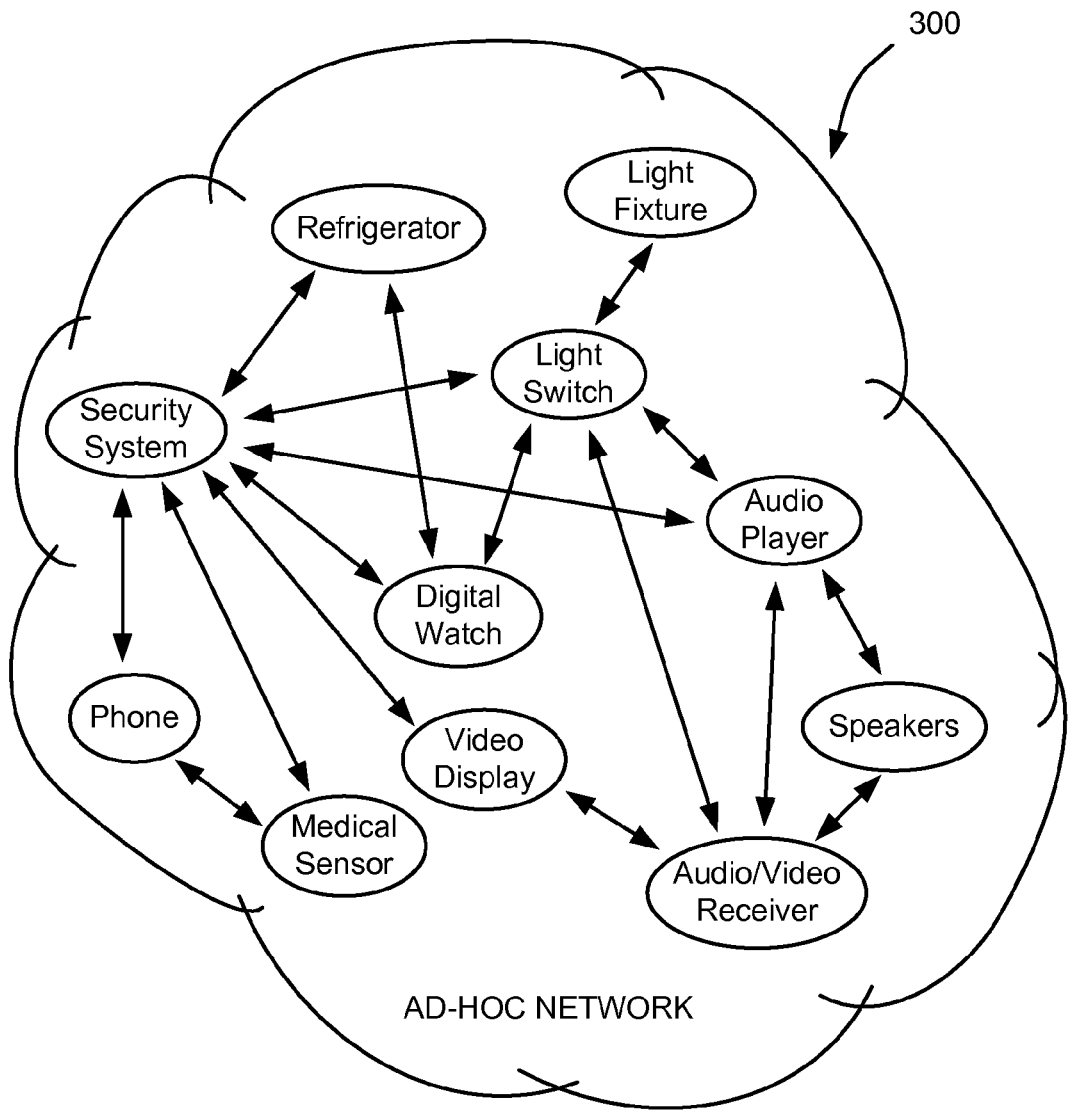
FIG. 3 illustrates an exemplary ad-hoc network comprised of a plurality of variously interconnected computationally enabled devices.
Figure 4:
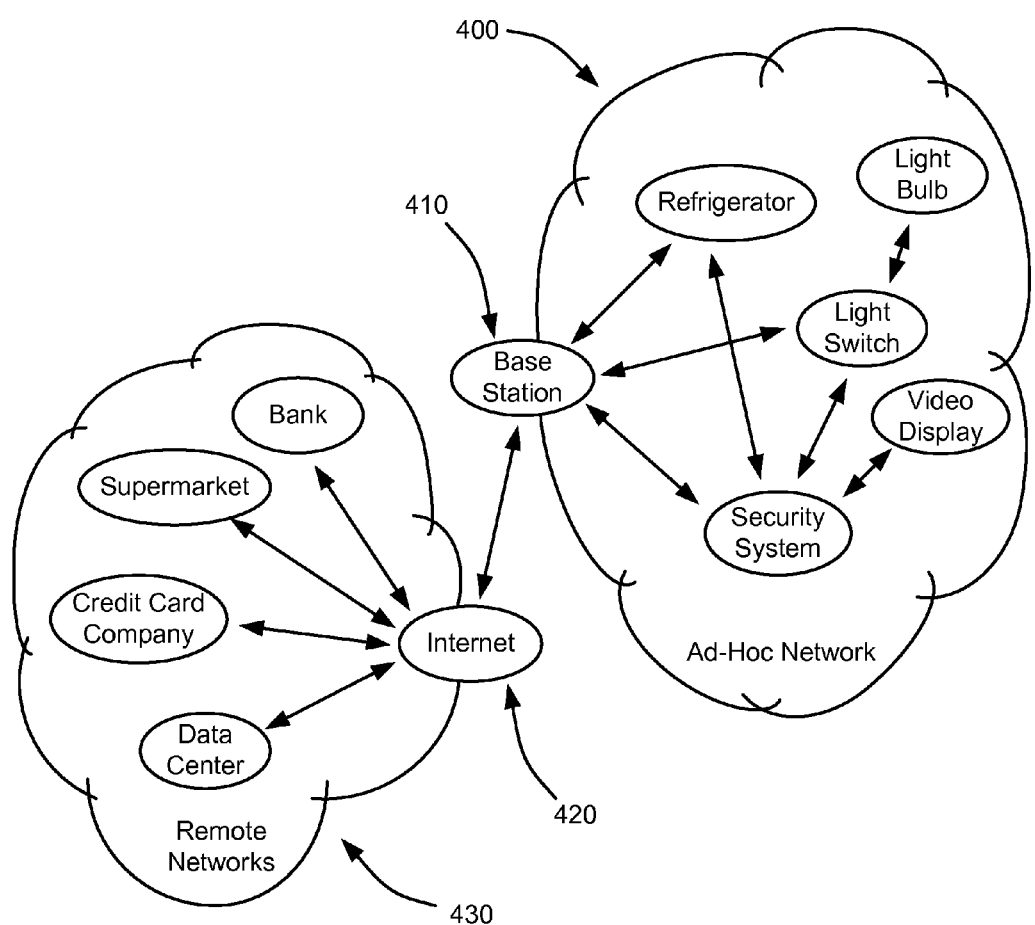
FIG. 4 illustrates an exemplary ad-hoc network comprised of a plurality of variously interconnected computationally enabled devices, with the ad-hoc network being connected to a plurality of remote networks across the Internet.

1.0 Exemplary Operating Environments:

FIG. 1 and FIG. 2 illustrate two examples of suitable computing environments on which various embodiments and elements of a "Device Correlator," as described herein, may be implemented. In addition, FIG. 3 and FIG. 4 illustrate two simple examples of ad-hoc network environments that are automatically configured by the Device Correlator as a function of observed context history and device capabilities, as described herein.

For example, FIG. 1 illustrates an example of a general computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The Device Correlator is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices. Particular devices in distributed computing environments, as described in further detail below, may also include devices having at least some minimum computational capability in combination with a communications interface, including, for example, home appliances, security systems, lighting, sensor networks, medical electronic devices, wearable computers, robotics, industrial controls, wired or wireless communication systems, audio nets, distributed computers, toys, games, etc.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, processing unit(s) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

In addition, the computer 110 may also include a speech input device, such as a microphone 198 or a microphone array, as well as a loudspeaker 197 or other sound output device connected via an audio interface 199. Other input devices (not shown) may include a joystick, game pad, satellite dish, scanner, radio receiver, and a television or broadcast video receiver, or the like. These and other input devices are often connected to the processing unit 120 through a user input interface 160 that is coupled to the system bus 121, but may be connected by other interface and bus structures, such as, for example, a parallel port, game port, or a universal serial bus (USB). A monitor 191 or other type of display device is also connected to the system bus 121 via an interface, such as a video interface 190. In addition to the monitor, computers may also include other peripheral output devices such as a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

With respect to FIG. 2, this figure shows a general system diagram showing a simplified computing device. Such computing devices can be typically be found in devices having at least some minimum computational capability in combination with a communications interface, including, for example, home appliances, security systems, lighting, sensor networks, medical electronic devices, wearable computers, robotics, industrial controls, wired or wireless communication systems, audio nets, distributed computers, toys, games, etc. It should be noted that any boxes that are represented by broken or dashed lines in FIG. 2 represent alternate embodiments of the simplified computing device, as described herein, and that any or all of these alternate embodiments, as described below, may be used in combination with other alternate embodiments that are described throughout this document.

At a minimum, to allow a device to join a networked environment, (as described in further detail below), the device must have some minimum computational capability and a communications interface. In particular, as illustrated by FIG. 2, the computational capability is generally illustrated by processing unit(s) 210 (roughly analogous to processing units 120 described above with respect to FIG. 1). Note that in contrast to the processing unit(s) 120 of the general computing device of FIG. 1, the processing unit(s) 210 illustrated in FIG. 2 may be specialized (and inexpensive) microprocessors, such as a DSP, a VLIW, or other micro-controller rather than the general-purpose processor unit of a PC-type computer or the like, as described above.

In addition, the simplified computing device of FIG. 2 may also include other components, such as, for example one or more input devices 240 (analogous to the input devices described with respect to FIG. 1). The simplified computing device of FIG. 2 may also include other optional components, such as, for example one or more output devices 250 (analogous to the output devices described with respect to FIG. 1). Finally, the simplified computing device of FIG. 2 may also removable and/or non-removable storage, 260 and 270, respectively (analogous to the storage devices described with respect to FIG. 1).

An example of a very simple ad-hoc network that is automatically configured by the Device Correlator is provided in FIG. 3. In general, FIG. 3 illustrates an ad-hoc distributed network 300 (or "invisible computing environment") comprised of a plurality of variously interconnected computationally enabled devices. Each of these devices is in contact with one or more other devices, which themselves may be in contact with yet other devices or other networks or trust domains (as described in further detail below).

Another example of a very simple ad-hoc network that is automatically configured by the Device Correlator is provided in FIG. 4. In general, FIG. 4 also illustrates an ad-hoc distributed network 400 (or "invisible computing environment") comprised of a plurality of variously interconnected computationally enabled devices. However, FIG. 4 also illustrates a base station 410, which connects the ad-hoc distributed network 400 to a plurality of remote networks 430 (or Internet sites) via the Internet 420.

The exemplary operating environments having now been discussed, the remaining part of this description will be devoted to a discussion of the program modules and processes embodying the "Device Correlator."

2.0 Introduction:

Computing that enhances existing everyday devices and makes them smarter without requiring extra human interaction is conventionally referred to as "invisible computing." Embedded real-time computing systems for entertainment and other consumer, or industrial, uses are increasingly built out of distributed components that are manufactured by multiple vendors. This means that in an "invisible computing" environment, interoperation between such components is an important factor. As described herein, the term "invisible computing environment" is also referred either to either as an "ad-hoc network" or as a "network environment" or the like.

For example, a typical home automation system enabled by an invisible computing environment might be required to integrate a variety of distributed devices or components such as computers, cellular phones, refrigerators, TVs, heating systems, watches, heart rate monitors, toys, music systems, video systems, appliances, light switches, dimmers, security systems, etc., produced by different manufactures at different times.

In general, each device within the invisible computing environment includes at least a minimum computational capability to respond to basic commands, and to perform assigned tasks, when ordered. Such computational capability can be provided by inexpensive conventional microcontrollers (costing on the order of only a few dollars each), including, for example, DSP's, VLIW's, or other microcontrollers, depending upon the particular device. However, the various devices may also include greater computational capability, such as in the case where a device is a PC-type computer, or some more powerful computing platform. In other words, the various devices form a distributed environment comprised of devices having various computing capabilities.

As described throughout this document, the terms "device touching," "touching," or simply "touch", are defined to mean any or all of the following:
  direct physical contact between devices; sequential contact of devices by a master device or "key;"
  indirect contact of devices, such as the use of laser pointers, flashlights, infrared devices, or the like, to sequentially highlight or otherwise designate particular devices;
  speech recognition for verbally identifying devices designated by the user;
  gesture recognition for identifying devices pointed to by the user;
  near-field communication between devices; and/or
  other conventional mechanisms for user designation of one or more electronic devices.

Further, also as defined herein, the term "context history" or "context" is defined to mean the temporal and/or spatial history of user interaction with particular devices or components within the invisible computing environment. In addition, the "context" associated with particular devices is also defined to include other context information, depending upon what information is available, and whether that information is pertinent to particular devices. In particular, other context information that is retrieved in various embodiments includes information such as sensory or environmental data and any associated states. For example, such data includes acceleration, indoor and/or outdoor air temperature, weather conditions, air pressure, location, proximity to other devices, time of day, number of humans present, specific humans present, types of businesses open nearby, the number/severity of sunspots, local lighting, traffic conditions, tone of voice, heart rate, blood pressure, utility rates, bid prices of energy futures options, smart watch buttons pressed at the time of device interaction, etc., just to name a few examples of additional "context" information.

A simple example of evaluating a context history with respect to temporal information would be the temporal history of a user "touching" a light switch followed within some period by the user "touching" a light fixture. In this case, the touched light fixture would be associated with, and thus controlled by, the touched light switch, as described in further detail below. An example of using other context information would be to automatically retrieve and evaluate context information of utility rates to automatically vary nominal lighting levels of touched light fixture-type devices as an inverse function of the retrieved utility rates. Another simple example of using utility rate information as "context" would be to automatically perform energy dependent applications, such as charging a "touched" electronic vehicle via a "touched" charger only during off-peak times when utility rates are lower.

In general, a "Device Correlator," as described herein, operates to identify and configure complementary or corresponding devices as a combined function of device "touching" and observations of contextual history of human interaction with the various devices in an ad-hoc network environment. Furthermore, in various embodiments, additional context information is also used, as available, to assist in configuring the devices.

New devices are brought into a local trust domain of the network via a "touch-based" process, as described in Section 3.1. Further, as each device is added to the trust domain, a contextual history of user interaction with each device is recorded as described in Section 3.2. This recorded context history is then evaluated to determine probable device associations as described in Section 3.3.

Finally, inter-device associations and device behaviors for trusted devices are then automatically configured as a function of both the context history and the capabilities of the various devices as described in Section 3.3. The result is an automatically configured invisible computing environment, wherein the only actions required by the user are to bring new devices into the local area of the ad-hoc network, and then designate those devices as being trusted. Examples of matched or corresponding devices that are automatically configured within this distributed environment include device combinations such as, for example, a light switch/light fixture pair, a music player paired with a receiver/speaker, a data sensor/data recorder pair, etc., to name only a few such device combinations.

In a tested embodiment, the capabilities of the Device Correlator described herein were implemented using an adaptation of open standards based XML Web Services (such as, for example, services based on Simple Object Access Protocol, "SOAP") both for application and for system/device communication in order to maximize the interoperability of the various devices comprising the ad-hoc network. Consequently, for purposes of explanation, the Device Correlator will be generally described herein in the context of an XML-based SOAP implementation. However, it should be clear that the capabilities and features described herein can be implemented with any desired scripting or coding language, and it is not intended to be limited to the use of an XML-based SOAP implementation.

2.1 System Overview:

As noted above, a "Device Correlator," as described herein, operates to identify and configure complementary or correlated devices (such as, for example, a light switch and a light fixture) as a combined function of device touching and observations of contextual history of human interaction with the various devices or components in an ad-hoc distributed network such as an invisible computing environment.

The first step in this automatic configuration is to bring new devices into a local trust domain of the network. Trusting new devices is accomplished using any of a number of conventional techniques. For example, one simple technique is to use a "master key" or other master trusted device to initialize new devices as they enter the network. In this case, a new device is automatically trusted whenever the master key touches or otherwise designates that new device. Concepts such as the use of master keys, and the like, are well known to those skilled in the art, and will not be described in detail herein. However, more generally, individual devices are brought into the trust domain of the ad-hoc network simply by "touching" those devices, as defined above, to designate those devices as being trusted for access to the network.

Further, as each device is added to the trust domain of the network, a contextual history of the user interaction (i.e., the "touching" of each device) with each device is recorded. This recorded context history is then evaluated to determine probable device associations. This information is then used to configure the resulting inter-device associations and device behaviors as a function of both the context history and the capabilities of the various devices. Note that the capabilities of the various devices are determined either as a function of direct reporting by the various devices, or by retrieving device capability information from a local or remote database given an identification of each device.

The result of the above summarized process is an automatically configured invisible computing environment, wherein the only actions required by the user are to bring new devices into the local area of the network environment, and then designate those devices as being trusted. So long as designation of the particular devices has some temporal or spatial relationship, evaluation of the context history of device designation allows the Device Correlator to perform the above-described automatic configuration.

Figure 5:
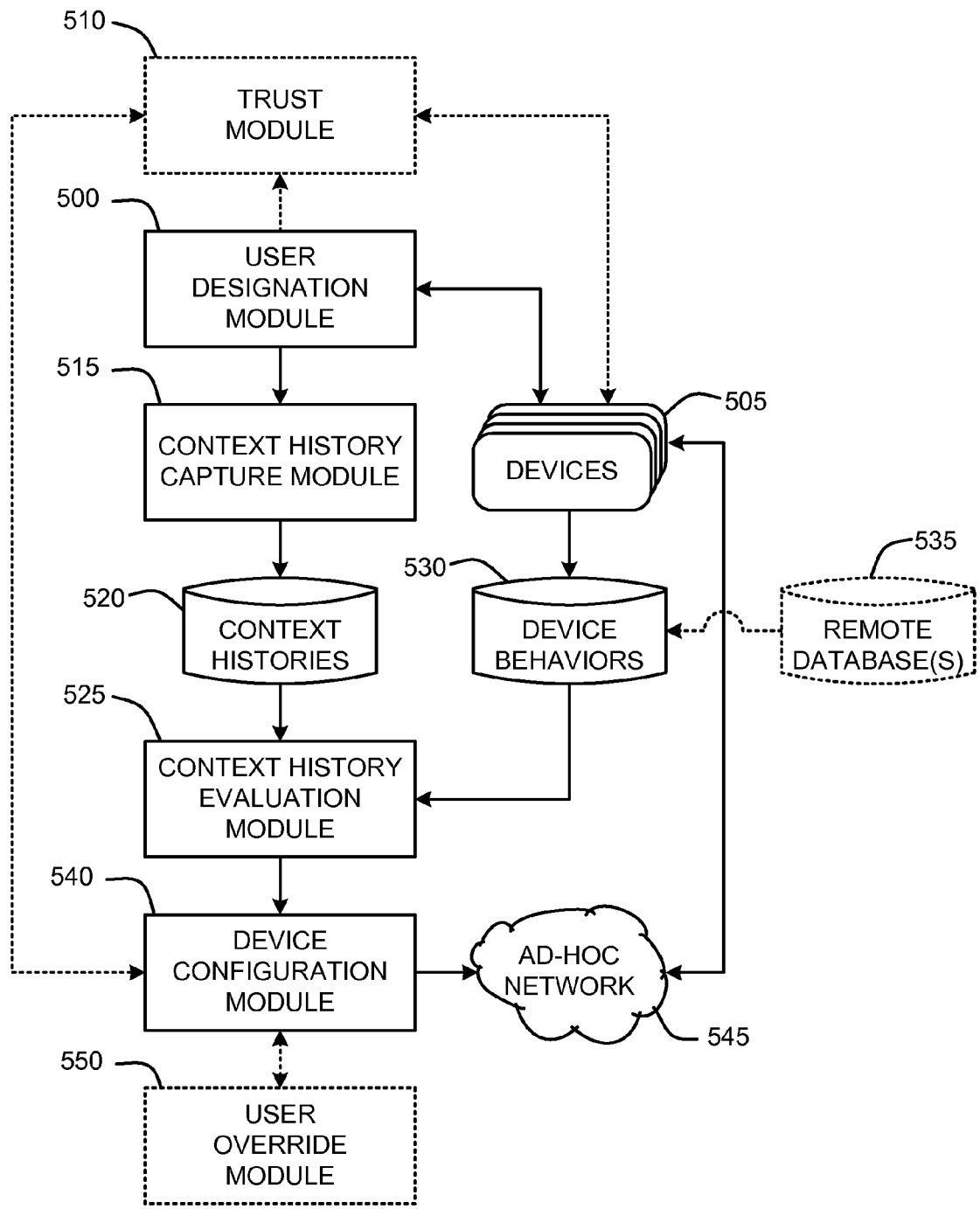
FIG. 5 illustrates an exemplary architectural diagram showing exemplary program modules for providing automatic configuration of interaction between devices in an ad-hoc network.

2.2 System Architecture:

The processes summarized above are illustrated by the general system diagram of FIG. 5. In particular, the system diagram of FIG. 5 illustrates general interrelationships between program modules for implementing the Device Correlator described herein. It should be noted that any boxes and interconnections between boxes that are represented by broken or dashed lines in FIG. 5 represent alternate embodiments of the Device Correlator described herein, and that any or all of these alternate embodiments, as described below, may be used in combination with other alternate embodiments that are described throughout this document.

In general, as illustrated by FIG. 5, the Device Correlator described herein is used to automatically configure device behaviors and inter-device interactions in an ad-hoc distributed network or "invisible computing" environment (such as, for example, the ad-hoc networks described above with respect to FIG. 3 and FIG. 4.

Operation of the Device Correlator begins by allowing a user to designate one or more devices 505 via a user designation module 500 for inclusion into an ad-hoc network 545. Designation of devices 505 via the user designation module 500 is accomplished by "touching" each device 505 that is to be included in the ad-hoc network.

In one embodiment, as each device 505 is designated via the user designation module 500, a trust module 510 automatically establishes a trust between each device and the ad-hoc network 545. One simple example of establishing such trust is to identify each device 505 by a unique certificate that contains a public key of the device, with each unique certificate then being signed by a private key associated with the ad-hoc network 545.

Further, as each device 505 is designated via the user designation module 500, a context history capture module 515 simultaneously records 520 any available history of the user interaction with each device, along with spatial information relating to each device, if available. The recorded context histories 520 are then provided to a context history evaluation module 525 along with corresponding device behavior information 530. As described in further detail below, in various embodiments, this device behavior information 530 is retrieved from individual devices 505, or from a local 530 or remote 535 database of device behaviors.

The context history evaluation module 525 then performs a statistical or probabilistic evaluation of the context histories 525 as a function the device behaviors 530 to determine what particular devices 505 are supposed to do, and what devices should be associated with each other. Further, in the aforementioned embodiment where only trusted devices are allowed into the network, these determinations are constrained by the trust domain such that any untrusted devices 505 are simply ignored.

Finally, once the context history evaluation module 525 has determined what devices 505 should be associated with each other, and what each device is supposed to do, the ad-hoc network 545 and the devices comprising that network are automatically configured in accordance with the determinations of the context history evaluation module. Note that in one embodiment, a user override module 550 is provided to allow a user to manually specify or correct device 505 associations and configurations for further customizing operation of the ad-hoc network 545.

3.0 Operation Overview:

The above-described program modules are employed by the Device Correlator to identify and configure complementary devices as a combined function of device "touching" and observations of contextual history of human interaction with the various devices in an ad-hoc network environment. New devices are brought into a local trust domain of the network via a "touch-based" process. Further, as each device is added to the trust domain, a contextual history of user interaction with each device is recorded. This recorded context history is evaluated to determine probable device associations. Finally, inter-device associations and device behaviors for trusted devices are then automatically configured as a function of both the context history and the capabilities of the various devices. The following sections provide a detailed operational discussion of exemplary methods for implementing the program modules provided above in Section 2.

3.1 Trust Establishment:

Trust is an important component of device access to networks. For example, in situations such as an invisible computing environment of an automated home, the homeowners should have total control over the network so that untrusted devices can not access the network or data within the network. The Device Correlator described herein uses conventional trust establishment protocols to allow entry of new devices into the network.

For example, in one embodiment, a conventional "Resurrecting Duckling Protocol" is used to establish device trust. In general, the "Resurrecting Duckling Protocol" operates by defining one device to be the authority—the "mother." New devices believe the first other device they see is their mother unless they already have one. The first contact is thus critical and a touch (or proximity) based communications channel is used to show devices their "mother." This "touch," as defined above, signifies a human intent and physical access to the mother device or "master key." One example of a "mother" is a "smart watch" which contains a master key to a user's network. One advantage to using such devices is that the user will usually be wearing the watch, thereby avoiding the necessity to carry or locate a dedicated master key when needed.

Note that in one embodiment, feedback is provided to the user to indicate successful "touching" of particular devices. In various embodiments, this feedback is device specific. For example, touching of an audio device can be an audible sound, while "touching" of a light fixture can be a flashing or blinking of lights. Further, a computing device can use recorded or synthesized speech, or displayed or printed text, to provide the user with verbal or textual feedback. Clearly, any of a number of conventional visual or audio queues, or any combination thereof, can be used to alert the user to a successful "touching" of a device.

Once touched, each new device is then identified by a certificate that contains the public key of the device, delivered over the communications channel. The certificates are signed by the mother with its private key. The mother certificate is received on the same communications channel. All later communication between the now trusted devices can then occur on a regular wired or wireless data link between the various devices. Note that the "Resurrecting Duckling Protocol" is well known to those skilled in the art, and will not be described in detail herein.

As noted above, the initial designation of devices for entry into the trust domain of the network is based on the concept of "touch," thereby preventing untrusted devices from gaining access to the network. However, in the case where trust is not a concern, such as in a completely open network, devices are still added to the network by using the same touch-based protocols described above. The advantage of using these touch-based protocols is that it allows the context history of human interaction with new devices to be observed and leveraged for automatic configuration of those devices with respect to their function and behavior on the network.

3.2 Creation of the Context History and other Context Information:

As described above, designation of devices for entry into the trust domain of the network, or simply designation of devices for entry into an open network, involves human interaction. Consequently, the precise pattern of that interaction can be recorded. A single instance of that interaction with a particular device is termed a "context event."

In addition, as defined above, other types of "context" information may include sensory or environmental data and any associated states, such as, for example, acceleration, indoor and/or outdoor air temperature, weather conditions, air pressure, location, proximity to other devices, time of day, number of humans present, types of businesses open nearby, the number/severity of sunspots, local lighting, tone of voice, heart rate, blood pressure, utility rates, bid prices of energy futures options, smart watch buttons pressed at the time of device interaction, etc., just to name a few examples of additional "context" information.

As described above, when new devices are to be brought into the network, they are "touched" to make them part of the "family" which represents the devices allowed into the network. Note that it is also possible to touch devices at other times at will, thereby providing a new context for those devices. One simple example of this would be the case where a user wanted a particular wall switch to control a different light fixture. In this case, the user would simply "touch" the wall switch followed by a "touch" of the new light fixture. The result context events would then result in a reconfiguration of those devices such that light switch would now control the recently touched light fixture rather than whatever device it had controlled previously.

A context event, like any data, is transmitted across the network to the Device Correlator. In a tested embodiment, these context events were represented as XML fragments. However, as noted above, any conventional data transfer protocol could be used here. In a tested embodiment, the XML fragments representing the context events were collected by a smart watch (acting as the master key) and then sent across the network to the Device Correlator, and to any other interested and/or trusted parties/devices based on any predefined event subscriptions.

In general, the context event contains the type of the device and its functions as well as how to contact it. Beside the time, the context event also contains the location of the device, to the extent known, and any available information of what the user did, such as buttons pressed at the time of the interaction. A log of these context events is then stored in a local or remote database, where it is available for queries and data mining. A simple example of two context events represented by XML fragments is provided below in Table 1:

TABLE 1

Exemplary Context Events

```
<interaction time="2005-02-21T18:25:00Z" type="touch">
  <function type="light" subtype="torchier" power="100" unit="watt"/>
  <location="floor" height="1.5" unit="meter"/>
  <watch-buttons>1 2</watch-buttons>
  <contact id="uuid:7796f8ac-ab60-49e5-a2e7-61db77e64096"
    url="http://123.45.67.89/discovery"/>
</interaction>
<interaction time="2005-02-21T18:26:00Z" type="touch">
  <function type="light-switch" subtype="lever" values="on off"/>
  <location="wall" height="2" unit="meter"/>
  <contact id="uuid:1a0e6bd0-806f-4bd8-8e93-c0afd97b1044"
    url="http://234.56.78.90/discovery"/>
</interaction>
```

In the first of the two context events in the above example (delimited by the "<interaction>. . . </interaction>" labels), the user "touched" a light fixture at date/time 2006-02-21 T18:25:00Z. The user then "touched" buttons "1" and "2" on the user's smart watch to enter the light fixture into the trust domain of the network. In the second of the two context events in the above example, the user then "touched" an already trusted light switch one minute later at date/time 2006-02-21 T18:26:00Z. The close temporal association of these two context events would then be used to associate the touched light with the touched light switch, as described in further detail in Section 3.3, so that the switch would then control the light via the network.

3.3 Evaluation and Exploitation of Context:

In general, the context history is exploited to determine functional relationships between the devices, as well as device behaviors that are relevant to particular elements of context information. In other words, the context history is heuristically evaluated to determine how the different devices should interact, and/or how particular devices should behave. A single touch per device is generally all that is needed to provide a temporal context for that device relative to other devices. This generally applies to all the devices in the invisible computing environment. However, multiple touches may also apply, such as with the case where a single switch is intended to control multiple devices.

Once a context history, and/or other context information is available, as described above, the Device Correlator uses that context to determine what particular devices are supposed to do, what devices should be associated with each other, and potentially, when devices should operate to perform particular tasks. Further, in an embodiment where only trusted devices are allowed, these determinations are constrained by the trust domain. In particular, untrusted devices are simply ignored. However, in one embodiment, federation of trust domains is used to enable limited cross-domain interaction between various devices.

A primary source of information in each context event is the timestamp. It is assumed that those context events that are close to each other temporally are related. However, since the pace of user interaction depends on the speed of the user and on the proximity of the devices, an absolute time difference, while useful in various embodiments, isn't always the best solution. Consequently, in another embodiment, rather than using an absolute time difference between context events, a statistical clustering algorithm is used.

First, obvious gaps, such as multiple hours, are used to partition the overall context history into sets. Next, every interval is examined and a normal distribution is calculated for each set. Each set is then separated into multiple subsets by picking a threshold value for the deviation. The largest deviation gaps are used as cutoff points to separate events into separate subsets. The threshold is progressively lowered until every set is of reasonable size, on the order of around 5 context events or so. Note that in the case where sets remain too large at a given threshold, sets containing too many context event entries are simply separated into two sets. Finally, the resulting subsets of context events are assumed to represent separate clusters of related functions.

Another source of information used in the evaluation of context events are the behaviors or capabilities associated with particular devices. For example, a switch turns power on or off, while a light fixture provides power to a light bulb whenever the associated switch is turned on. In general, these device behaviors can be maintained either within some addressable memory within each corresponding device, in an external lookup table, file, or database (either local or remote) that is accessible to the Device Correlator. Note that in alternate embodiments, this behavior information is either included in each context event, or is retrieved as needed in association with the evaluation of the context events, as described in further detail below.

In either case, given the device behaviors, the aforementioned clusters are then examined to identify compatible functions such as a light and a light-switch. Compatible functions are then linked together. In other words, the relative temporal proximity of two compatible devices determines their functional relationship. If no compatible functions or behaviors are found, the temporal proximity requirement is loosened by backtracking the set splitting described above until some useful relationships are found. Furthermore, in a related embodiment, when device location is known, it used together with the temporal proximity to determine overall proximity by mixing temporal and spatial proximity together with heuristically determined weights.

The result of the above-described functional (partitional) clustering is that the light-switch ends up controlling the light given that they were both touched in a reasonably close time span.

In a related embodiment, the user is allowed to control the partitioning process to indicate that the clustering should be split at a given point. For example, pressing "button 2" on a smart watch while touching a device could signal that the current device has nothing to do with any previous devices. Such embodiments are useful in cases, such as, for example, when the user is moving from one room to another, touching devices, without a break in between.

One advantage of the aforementioned statistical clustering process is that the described clustering algorithm does not contain any complicated math. As a result, the clusters can be completely calculated using fixed point integer arithmetic in linear time. This makes it suitable for microcontroller use in the event that a more powerful computing platform, such as a PC type computer, is not available for such use on the network. However, it should be clear that in additional embodiments, given increased computing power, more elaborate and sophisticated schemes, such as the use of Markov models and Bayesian networks may be used for data mining of the context events to determine more complicated functional relationships between the various devices.

Finally, as noted above, in yet another embodiment, device behaviors are further modified by the Device Correlator as a function of other available context information. For example, as described above, light fixtures may be automatically dimmed or brightened as a direct function of utility rate context information retrieved via the Internet or other information source.

Figure 6:
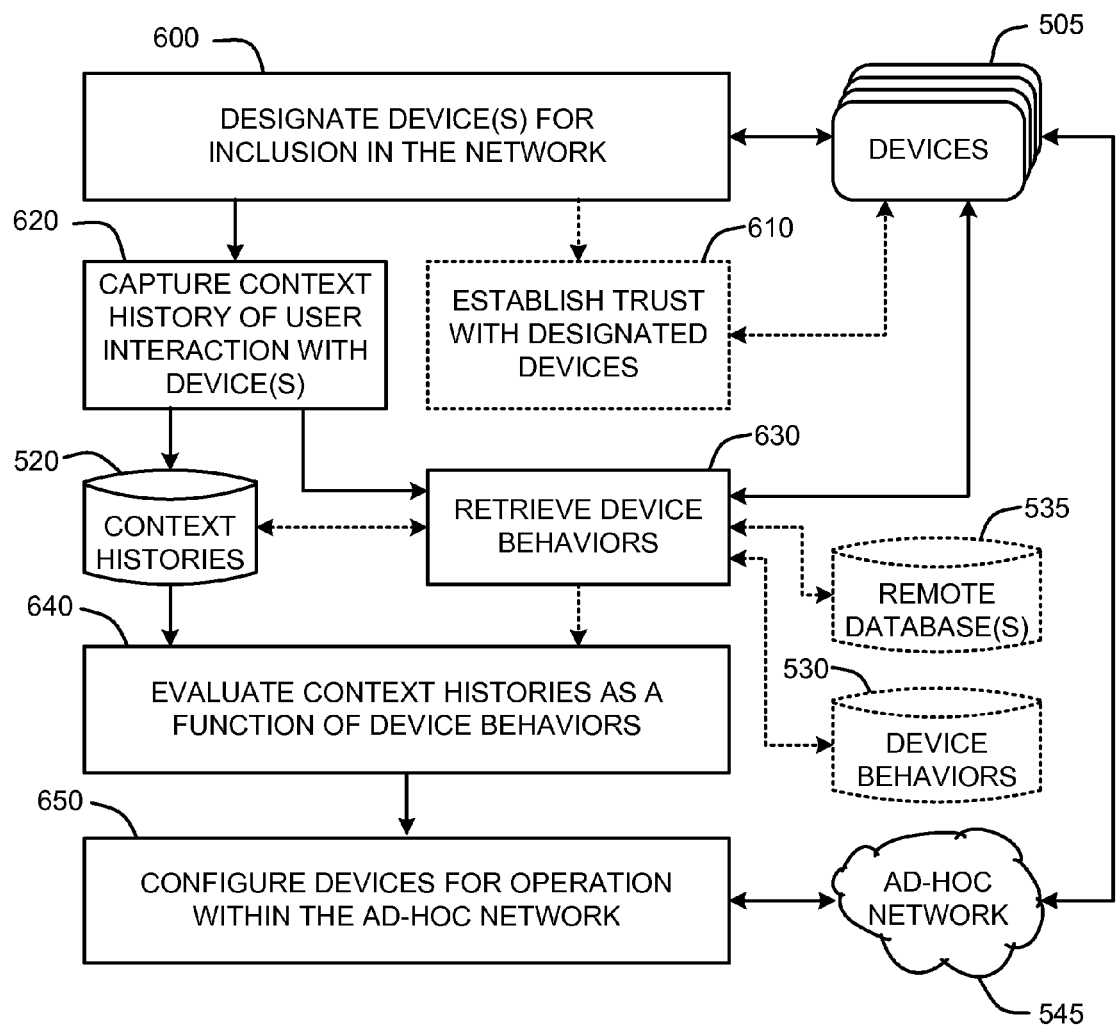
FIG. 6 illustrates an exemplary operational flow diagram showing automatic configuration of interaction between devices in an ad-hoc network as a function of observed context history and device capabilities.

4.0 Implementation of the Device Correlator:

As noted above, the program modules described in Section 2.0 with reference to FIGS. 2 through 5 and in view of the detailed description provided in Section 3, are employed enable the Device Correlator described herein. The general operation of one embodiment of the Device Correlator is depicted by FIG. 6, which illustrates an exemplary system flow diagram for automatically configuring devices for inclusion in an invisible computing environment as a function of context history and device behaviors. It should be noted that the boxes and interconnections between boxes that are represented by broken or dashed lines in FIG. 6 represent alternate embodiments of the Device Correlator, and that any or all of these alternate embodiments, as described throughout this document, may be used in combination.

Referring now to FIG. 6, operation of the Device Correlator begins by designating 600 one or more devices 505 for inclusion on the network 545. In general, this designation is accomplished as a function of "touch." As discussed above, in one embodiment, this "touch" serves to automatically establish trust 610 between the trusted device and the network 545.

Furthermore, also as described above, another use of device touching is to enable the capture 620 of context histories 520 that represent the temporal and/or spatial history of user interaction with the touched devices 505. This capture 620 of the context data 520 occurs concurrently with designation 600 of devices 505 for inclusion in the network 545.

Given the context histories 520 of user interaction with the devices 505, it is necessary to retrieve 630 the device behavior information that defines the functional characteristics of each device. As described above, this behavior data 530 is retrieved either directly from the devices 505 themselves, or from a local 530 or remote 535 database of device behaviors. The behavior information 530 is then either included as a component of the context histories 520, or provided separately along with the context histories for evaluation 640 of the context histories as a function of the device behaviors.

As discussed above, this evaluation 640 of the context histories 520 is a statistical or probabilistic analysis for determining probable device 505 associations and inter-device interactions relative to device behavior 530 and user interaction with the device occurring during the designation 600 of those devices for inclusion in the network 545. Finally, once these device 505 associations have been determined, the devices comprising the ad-hoc network 545 are automatically configured by defining the operational parameters of the devices within the network.

The foregoing description of the Device Correlator has been presented for the purposes of illustration and description. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Clearly, many modifications and variations are possible in light of the above teaching. Finally, it should be noted that any or all of the aforementioned embodiments may be used in any combination desired to form additional hybrid embodiments of the Device Correlator described herein.

What is claimed is:

1. A method for automatically configuring behaviors and interactions of a plurality of electronic components variously interconnected in a network environment, comprising:
    designating one or more electronic components for entry into a local domain of a network environment;
    recording context histories of user interaction with the components concurrent with the designation of the electronic components for entry into the local domain;
    evaluating the recorded context histories to determine probable inter-component associations as a function of predefined component behaviors; and
    automatically configuring components and inter-component interactions as a function of the evaluation of the context histories and the predefined component behaviors.

2. The method of claim 1 wherein evaluating the recorded context histories to determine probable inter-component associations performing a statistical analysis of the recorded context histories with respect to the predefined component behaviors.

3. The method of claim 2 wherein the statistical analysis comprises:
    forming one or more temporal clusters of user interaction with each component;
    dividing the temporal clusters into a plurality of subsets corresponding to statistically matched user-component interactions; and evaluating the subsets to identify compatible functional relationships of components represented by each subset with respect to the predefined component behaviors.

4. The method of claim 1 wherein designating electronic components for entry into the local domain comprises using a master device for touching each component to grant each component entry into the local domain.

5. The method of claim 1 wherein the local domain of the network environment is a trusted domain that is restricted to trusted components, and wherein designating any electronic component for entry into the local domain automatically establishes a trust between that electronic component and the network environment.

6. The method of claim 5 wherein establishing the trust between any electronic component and the network environment comprises identifying each electronic component by a unique certificate that contains a public key of the electronic component, with the unique certificates being signed by a private key associated with the network environment.

7. The method of claim 1 wherein the context histories are represented by XML scripts.

8. The method of claim 1 further comprising automatically reconfiguring components and inter-component interactions as a function of re-designating one or more of the electronic components following entry of the components into the local domain of the network environment.

9. The method of claim 1 wherein the context histories further includes additional context information pertinent to the operation of one or more particular components; said additional context information being automatically retrieved from one or more external sources of context information.

10. The method of claim 1 further comprising any of a visible and audible feedback for alerting the user to a component configuration status.

11. The method of claim 5 wherein the trust is maintained as a function of certificate-based authentications between various components.

12. A computer readable storage medium having computer executable instructions for automatically configuring electronic devices addressable via an ad-hoc network environment, said computer executable instructions comprising:
designating a plurality of electronic devices as being trusted for entry into a network environment by using a master key to identify each device as being trusted;
recording a context history of user interaction with each device concurrent with use of the master key for identifying each device;
performing a statistical analysis of the recorded context histories with respect to predefined device behaviors for automatically determining probable inter-device associations; and
automatically configuring device behaviors and inter-device interactions as a function of the evaluation of the context histories and the predefined device behaviors.

13. The computer readable storage medium of claim 12 wherein the statistical analysis comprises:
forming one or more temporal clusters of user interaction with each device relative to the use of the master key;
dividing the temporal clusters into a plurality of subsets corresponding to statistically matched user-device interactions; and
evaluating the subsets to identify compatible functional relationships of devices represented by each subset with respect to the predefined device behaviors.

14. The computer readable storage medium of claim 12 wherein the network environment is a trusted domain that is restricted to trusted devices that have been identified by the master key.

15. The computer readable storage medium of claim 14 wherein establishing the trust between any electronic device and the network environment further comprises identifying each electronic device by a unique certificate that contains a public key of the electronic device, with the unique certificates being signed by a private key associated with the network environment.

16. The computer readable storage medium of claim 12 wherein the context histories are represented by XML scripts.

17. A system for identifying and configuring correlated devices in an ad-hoc distributed network environment, comprising using one or more computing devices for:
allowing one or more identified devices to be entered into a local trust domain of a network following user identification of the devices as being trusted;
recording a contextual history of user interaction with each device as each device is allowed into to the trust domain of the network;
evaluating the recorded contextual histories to determine probable device associations;
configuring inter-device associations and device behaviors as a function of both the probable device associations and predefined capabilities of the trusted devices.

18. The system of claim 17 wherein the predefined capabilities of the identified devices are determined by any of:
direct reporting by one or more of the devices; and
retrieving device capability information for one or more of the devices from one or more databases.

19. The system of claim 17 further comprising automatically reconfiguring one or more of the inter-device associations and device behaviors as a function of re-designating one or more of the devices following entry of the devices into the trust domain of the network.

20. The system of claim 17 wherein user identification of the devices as being trusted is accomplished by using a master key device to affirmatively designate one or more of the devices as being trusted.

* * * * *